June 24, 1958  R. J. VERBA  2,840,038
GUN ARM COATING APPARATUS
Filed Dec. 4, 1953  3 Sheets-Sheet 1

INVENTOR.
RICHARD J. VERBA
BY
Ely, Frye & Hamilton
ATTORNEYS

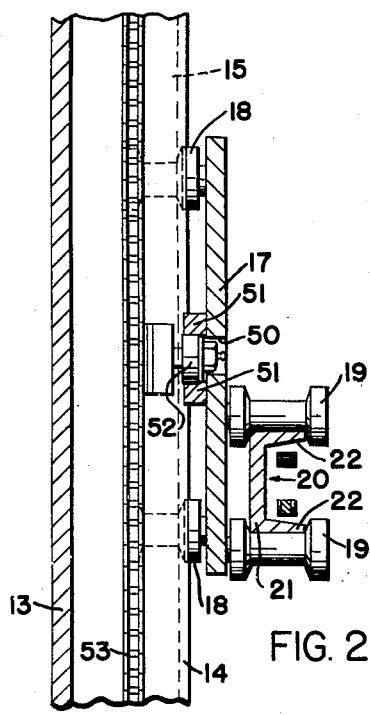
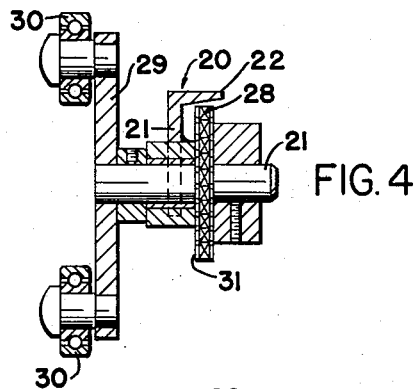
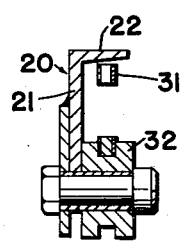
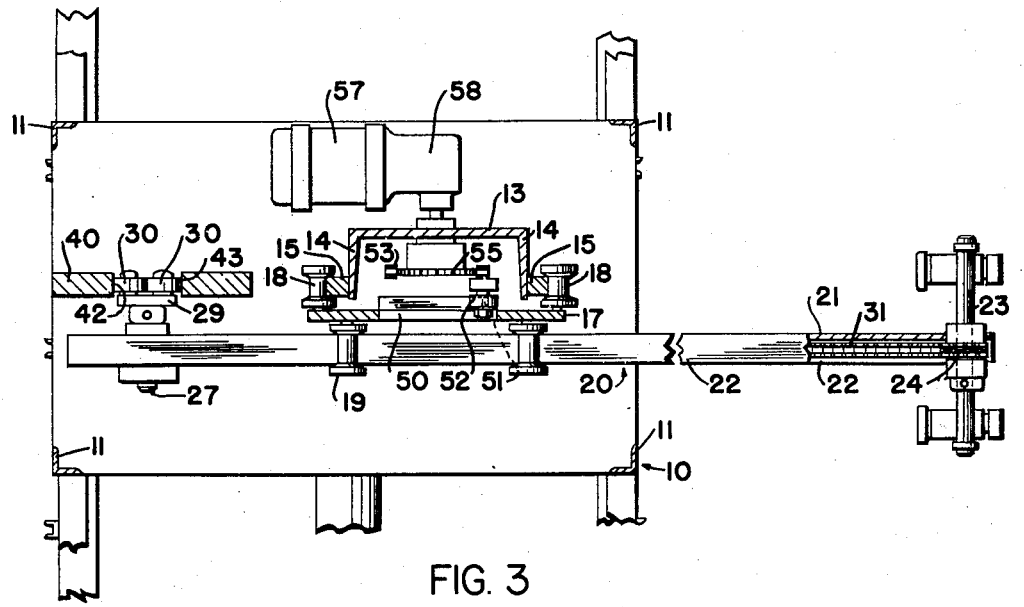

June 24, 1958 R. J. VERBA 2,840,038
GUN ARM COATING APPARATUS
Filed Dec. 4, 1953 3 Sheets-Sheet 3

INVENTOR.
RICHARD J. VERBA
BY Ely, Frye & Hamilton
ATTORNEYS

United States Patent Office 2,840,038
Patented June 24, 1958

2,840,038
GUN ARM COATING APPARATUS

Richard J. Verba, Fairview Park, Ohio, assignor to Howard V. Schweitzer, Broward County, Fla.

Application December 4, 1953, Serial No. 396,157

8 Claims. (Cl. 118—323)

This invention relates to coating apparatus and more particularly to a machine for coating large curved surfaces which may terminate in re-entrant or sharply turned-in areas such as automobile hoods which characteristically curve gently from rear to front, terminating in an abruptly downwardly extending area at the front end, or automobile roofs which characteristically curve gently from side to side and break sharply downwardly at each outer side.

Automatic spray machines have heretofore been provided designed to coat a succession of automotive bodies or parts thereof which are transported past the spraying station by a powered conveyor. The object of the present invention is to provide a machine adapted to perform such coating with particular efficiency and economy. The invention comprises a gun-motion linkage which is adapted to provide substantially uniform coating throughout a wide range of curvature over a broad body or target surface and which is, at the same time, of relatively simple, light and therefore economical construction. Provision of this gun-motion linkage makes possible machines which are both more economical and more efficient than the contour-following or contour-approximating coating machines of the prior art.

The gun-motion linkage contemplated by the invention incorporates within a gun arm structure, which is adapted to be transposed longitudinally and laterally, an angular-motion-multiplying linkage in such a manner that large expanses may be covered in long sweeping strokes while, simultaneously, sharply curved or reentrant areas are accommodated.

A specific embodiment of the invention is described below and in the accompanying drawings. It will be understood that many details of the following specific disclosure may be altered without departing from the provision of a transversely and longitudinally transposed gun arm comprising an angular-motion-multiplying linkage. The following description, therefore, is merely exemplary of the invention. In the drawings:

Figure 2 is a cross-section taken on line 2—2 in Figure 1;

Figure 3 is a cross-section taken on line 3—3 in Figure 1;

Figure 4 is a cross-section taken on line 4—4 in Figure 1;

Figure 5 is a cross-section taken on line 5—5 in Figure 1;

Figure 1:
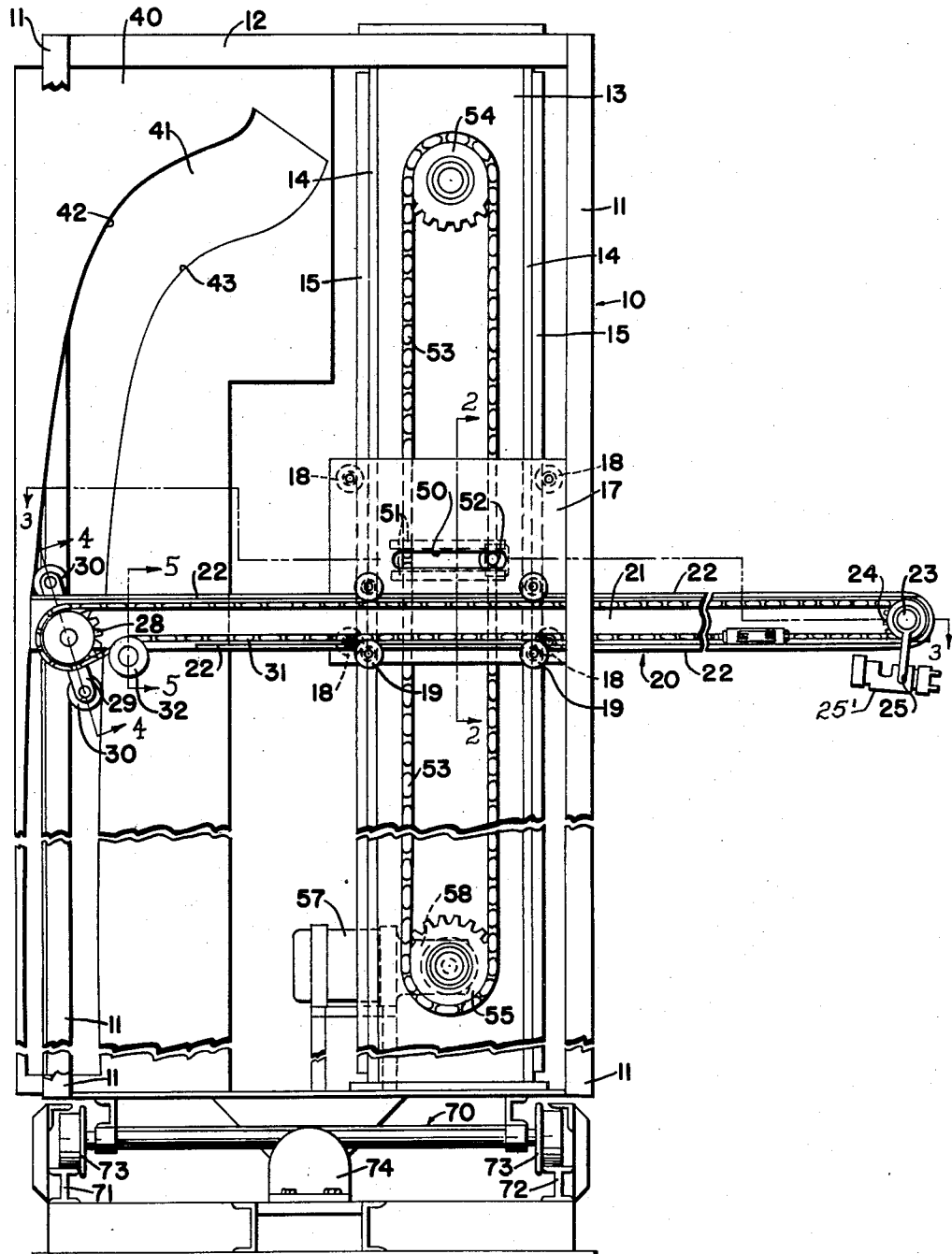
Figure 1 is an elevation of a hood and fender coating machine embodying the invention.

The illustrated embodiment comprises a frame, generally indicated at 10, including vertical beams 11 and transverse beams 12. Extending generally vertically from the top to the bottom of the frame 10 is a channel 13 having flanges 14 to which are welded track strips 15 (see Figure 3). Mounted for reciprocation along the channel 13 is a carriage 17 having rollers 18 which contact the track strips 15 in rolling engagement. On the opposite side of the carriage 17 from the rollers 18 are mounted gun arm guide rollers 19. These rollers support a gun arm, generally indicated at 20, which is thus mounted for longitudinal shifting movement with respect to the carriage 17. The gun arm comprises a channel 21 having flanges 22, the lowermost of which is cut away at the left end of the gun arm (as viewed in Figure 1).

Suitably rotatably mounted at the right end of the channel 21 (as seen in Figure 1) is a shaft 23 to which are keyed a sprocket 24 and a gun mounting bracket 25. Suitably rotatably mounted at the left end of the gun arm 20 (as seen in Figure 1) is a shaft 27 having keyed thereto a sprocket 28 and a follower arm 29. At opposite ends of the follower arm are mounted follower rolls 30. The sprockets 24 and 28 receive a sprocket chain 31, the size of the respective sprockets being such that the drive ratio from the sprocket 28 to the sprocket 24 is 2:1. In order to accommodate the spread of the chain in passing around the relatively large sprocket 28, a supplemental chain guide roller 32 is provided near the cam follower end of the gun arm 20.

The chain 31 is urged by a spring means (not shown) mounted on the carriage 17 in such a direction as to cause the follower arm 29 to tend to turn in a counterclockwise direction (as viewed in Figure 1). Suitably fixed to the frame 10 is a generally vertically extending cam plate 40 having a cut-away area 41 to define a pair of inwardly facing cam tracks 42 and 43. Formed in the carriage 17 is a center slot 50, preferably surrounded by supplemental guide strips 51, adapted to receive a drive pin assembly 52. The drive pin assembly is affixed to a chain 53 carried on the sprockets 54 and 55 which are rotatably mounted on the center web of the channel 13. The sprocket 55 is driven by a suitable power source such as the motor 57 and reduction gearing 58. The mounting of the drive pin assembly on the chain 53 comprises a conventional pin connecting link of the type which will be apparent to those familiar with chain and pin drives.

The illustrated embodiment is designed for use in coating hood and fender assemblies carried thereby on an overhead conveyor (not shown), the conveyor direction being from the front to the rear of the plane of Figure 1 and just to the right thereof.

In this particular use it will be necessary to reciprocate the entire assembly mounted within the frame 10 in order to intermittently synchronize the entire assembly with the translatory motion of passing hood and fender assemblies. The hood and fender assemblies are generally rotatably hung from an overhead conveyor in groups of two to present an array having an outer surface along a surface of revolution, the upper end thereof being relatively abruptly curved inwardly, as indicated schematically by Figure 6, in which the left side of such an array is indicated by the reference "A."

In this type of operation the hood and fender array to be coated is mounted on the overhead conveyor in such a manner that the array is caused to rotate as it passes the coating station. Such arrangements are standard in the art and may be of the type disclosed in my co-pending application, Serial No. 393,638, filed November 23, 1953, now Patent No. 2,787,979.

The reciprocating means for the frame 10 is indicated generally at 70 (Figure 1) and may comprise rails 71 and 72 upon which frame-bearing wheels 73 travel, the entire assembly being actuated by a hydraulic cylinder (not shown) behind the fixed end plate 74. The frame reciprocating means 70 is responsive to passage of a target body to initiate travel of the frame 10 in synchronization with the translation of the target body and to provide for return of the frame 10 to initial position after sufficient time to accommodate the coating operation. Details of such a synchronizing and indexing drive of a coating assembly are disclosed in the aforesaid co-pending application.

It will be apparent that a suitable "on-and-off" camming arrangement (not shown) for the paint gun is also provided so that the gun will only operate when it is in juxtaposition with the target array. Again, this "on-and-off" paint gun control may be similar to that disclosed in the aforesaid co-pending application.

The operation of the illustrated embodiment is as follows:

As a target array approaches the painting station, the frame 10 is translated in synchronization therewith by the hydraulic cylinder behind the fixed end plate 74. Simultaneously with the initiation of such motion, or shortly thereafter, the paint gun is turned on and coating commences. The gun arm 20 is carried bodily in a vertical reciprocating path by the carriage 17, which is constantly driven in a reciprocating path by the drive pin 52. The gun arm is shifted longitudinally by the cam followers 30. In so far as the motion applied to these cam followers by the cam tracks 42 and 43 is translatory rather than angular, the gun arm 20, together with the paint gun 25', will be translated bodily in a longitudinal direction to accommodate varying radii of the target array at various vertical locations. In so far as the follower rolls 30 are caused to shift angularly with respect to the axis of the shaft 27 by convergence or divergence of the cam tracks 42 and 43, longitudinal shifting of the gun arm 20 will not be effected, but multiplied angular movement of the paint gun will occur.

Figure 6:
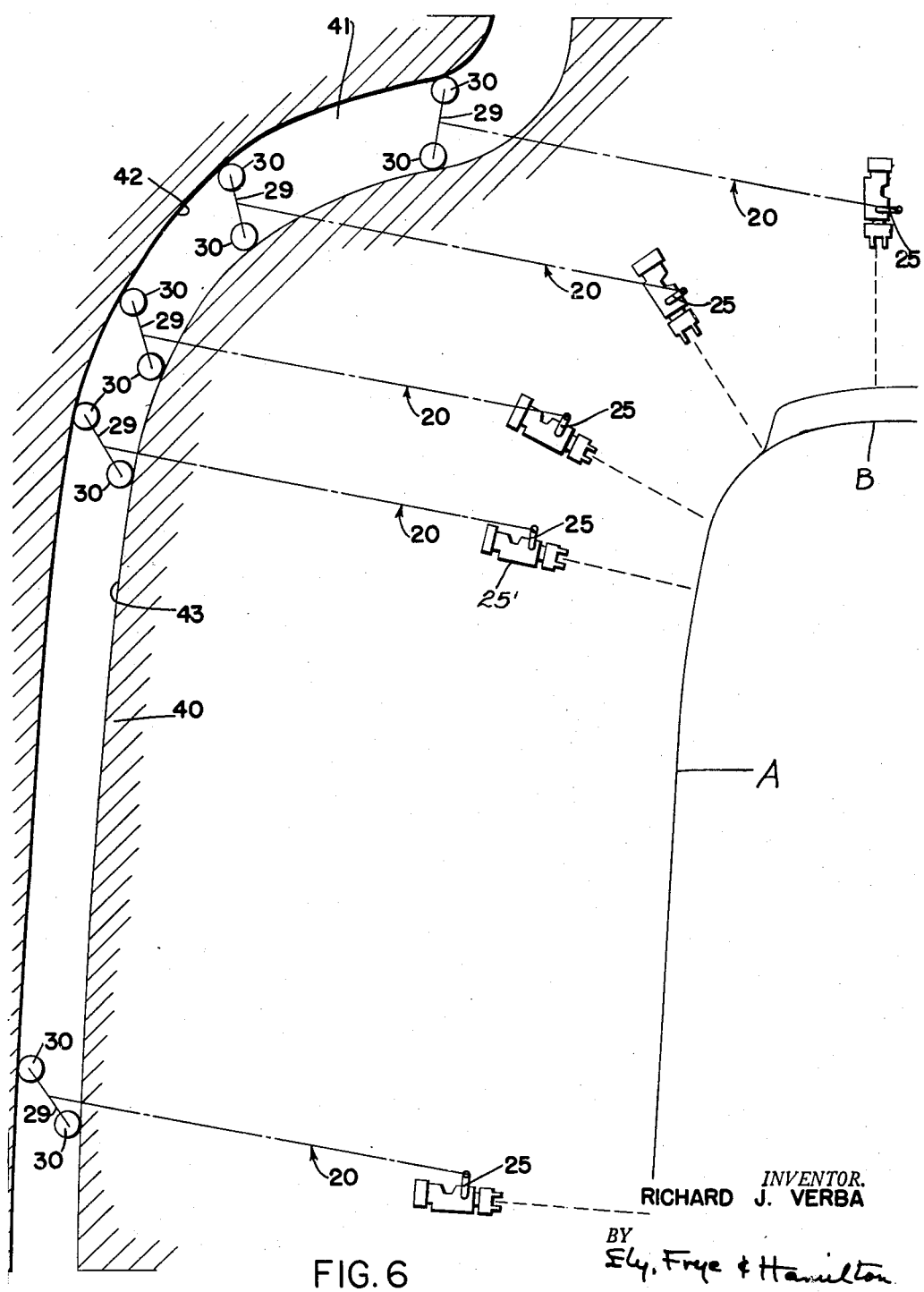
Figure 6 is a schematic representation of the paint gun motion of the illustrated embodiment.

As may be understood from Figure 6, the extreme angular position "B," necessary to coat the inwardly curved end of the target, can only be attained through the use of the motion-multiplying linkage, the characteristics of a double-camming arrangement such as that of the type illustrated being such that a degree of rotation of angular movement of the cam followers approaching an angular displacement of 90 degrees or more cannot be accommodated without binding and failure of the cam system. That is, if it were attempted to make the space between the tracks 42 and 43 narrower at their top end (as seen in Figure 6) in order to cause the follower to rotate further clockwise, leverage on the follower arm would become so great as to cause the follower assembly to bind between the tracks 42 and 43.

In the illustrated embodiment, the transversely and longitudinally shiftable cam arm accommodates long sweeping contour-following strokes of the paint gun. This structure is simple and compact in relation to the height of target to be traversed. The frame 10, channel 13, cam plate 40 and chain 53 comprise either fixed members or standard chain elements, and these are the only parts whose necessary size or length is directly tied to the height of the target. The actual gun shifting linkage (comprising all moving parts of the machine with the exception of the chain drive) is small and compact and may be of relatively light and inexpensive construction. At the same time, this accommodation of a high target by a small gun control linkage without sacrifice of even coating of sharply curved or re-entrant areas is made possible by the angular-motion-multiplying linkage which forms part of the gun arm linkage as described above.

It will be apparent that an identical or equivalent linkage could be embodied in machines to coat the high upstanding sides of roofs of car bodies or other large target bodies carried in succession along a conveyor line. In such applications, the target would not turn, and it would not be necessary to shift the coating machine bodily along the conveyor line—this being done in the present embodiment to maintain the paint gun at the high point of the surface of revolution formed by hood and fender target arrays.

In view of the variety of applications in which the invention may be utilized, the scope thereof is not limited to the specific embodiment described above but is to be defined by the following claims.

What is claimed is:

1. In a coating machine, a carriage, a carriage track extending along a given path, means to reciprocate said carriage along said carriage track in said given path, a gun arm, means reciprocably mounting said gun arm on said carriage for reciprocating movement transverse to said given path, cam track means extending adjacent to said carriage track, follower means pivotally mounted on a first end of said gun arm and in following engagement with said cam track means whereby when said carriage is reciprocated said cam track means causes said follower means to be pivoted relative to said gun arm and to be translated relative to said carriage, said latter translatory motion of said follower means causing said gun arm on which said follower means is pivoted to be correspondingly translated, a paint gun, paint gun mounting means pivotally mounted on a second end of said gun arm and drive linkage means linking said follower means and said spray-gun mounting means for simultaneous angular motion, said drive linkage means including motion multiplying means.

2. A machine as defined in claim 1, in which said carriage track and said cam track means are mounted on a common frame, and means to reciprocate said frame transversely both to said given path and to the path of reciprocation of said gun arm.

3. In a coating machine, a frame, a carriage track mounted on said frame, a carriage mounted for reciprocating movement on said carriage track, means to reciprocate said carriage on said carriage track, a pair of cam tracks mounted on said frame and extending generally along said carriage track, a gun arm mounted on said carriage for reciprocating motion relative to said carriage and transverse to said carriage track, a member pivotally mounted on a first end of said gun arm, gun mounting means pivotally mounted on a second end of said gun arm, a pair of cam followers, each of said cam followers being in following engagement with one of said cam tracks, said cam followers being mounted on said member whereby translatory motion imparted to said cam followers by said cam tracks is in turn imparted through said member and said gun arm to said gun mounting means, drive means between said member and said gun mounting means whereby angular motion imparted to said member by said cam tracks through said cam followers is imparted to said gun mounting means, said drive means including motion multiplying means.

4. A machine as defined in claim 3, said frame being mounted for reciprocation along a path transverse to both said carriage track and to the path of reciprocation of said gun arm.

5. In a coating machine, a gun control linkage comprising a beam, a first relatively large sprocket rotatably mounted at a first end of said beam and keyed for rotation with a pair of arms extending radially from the axis of said sprocket, means for moving said arms in accordance with the shape of an article to be coated, a second relatively small sprocket rotatably mounted at the second end of said beam and keyed for rotation with a paint gun bracket, flexible tension transmitting means engaged with said sprockets and extending therebetween whereby angular motion of said first sprocket will be multiplied and transmitted to said second sprocket, and means mounting said beam for longitudinal reciprocation.

6. A linkage as defined in claim 5, said last named means being mounted for reciprocation in a direction transverse to the longitudinal direction of said beam.

7. In a coating machine, a gun control linkage comprising a beam, a first relatively large sprocket rotatably mounted at a first end of said beam and keyed for rotation with a pair of arms extending radially from the axis of said sprocket, a pair of cam tracks extending generally transversely to the longitudinal direction of said beam, a cam follower at the end of each of said pair of arms, each of said cam followers being in engagement with one of said pair of cam tracks, a second relatively small sprocket rotatably mounted at the second end of said beam and keyed for rotation with a paint gun bracket, flexible tension transmitting means engaged with said sprockets and extending therebetween whereby angular motion of said first sprocket will be multiplied and transmitted to said second sprocket, and means mounting said beam for longitudinal reciprocation.

8. A linkage as defined in claim 7, said last named means being mounted for reciprocation in a direction transverse to the longitudinal direction of said beam.

References Cited in the file of this patent

UNITED STATES PATENTS

| | | |
|---|---|---|
| 2,321,983 | Brackett | June 15, 1943 |
| 2,344,108 | Roselund | Mar. 14, 1944 |
| 2,345,834 | Schweitzer | Apr. 4, 1944 |
| 2,587,284 | Brewer et al. | Feb. 26, 1952 |